Jan. 12, 1937.  E. H. TAYLOR  2,067,801
METAL STRIP FOR AND METHOD OF MAKING SPIRAL PIPE
Filed Sept. 28, 1935
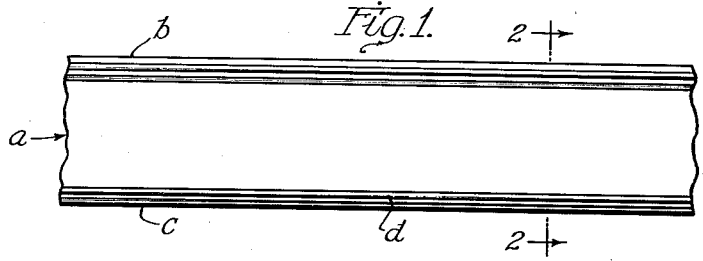
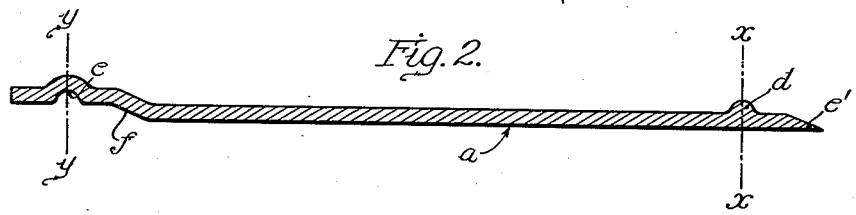
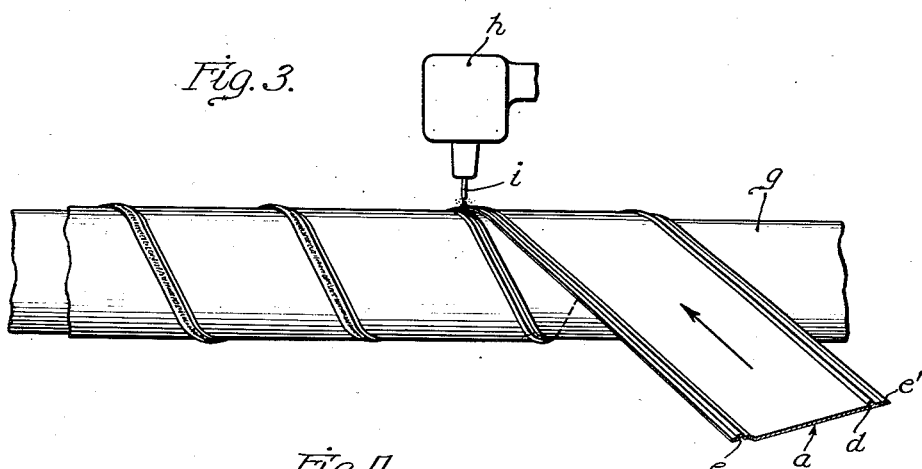
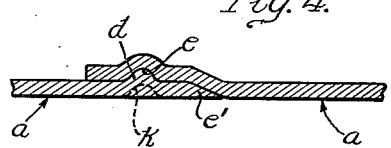
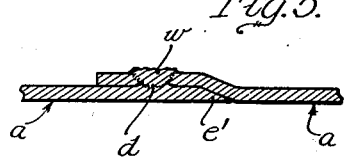
Inventor:
Edward Hatt Taylor
By: Brown, Jackson, Boettcher + Dienner,
Attys.

Patented Jan. 12, 1937

2,067,801

UNITED STATES PATENT OFFICE 2,067,801

METAL STRIP FOR AND METHOD OF MAKING SPIRAL PIPE

Edward Hall Taylor, Oak Park, Ill.

Application September 28, 1935, Serial No. 42,594

9 Claims. (Cl. 113—35)

This invention relates to spiral pipe produced from metal strip wound spirally and welded, one convolution to another, and has to do with pipe of this type of improved construction, and with a novel method for producing such pipe with expedition and facility.

It is known to produce spiral pipe by winding metal strip spirally into tubular form with the edge portions of the adjacent convolutions of the wound tubing in overlapping relation to provide lap joints, and to weld together the overlapping margins of the strip. In the commercial production of metal strip, it frequently happens that there is considerable variation in the width of the strip. This renders it difficult to wind the strip accurately in such manner as to assure uniform effective width of the convolutions. Also, in spiral pipe produced in this manner, under present practice, the arc from the welding electrode tends to spread laterally and its heat is thus dissipated to a considerable extent and does not readily penetrate the underlap of the joint to the desired depth, the resulting weld being unnecessarily wide while not of proper depth for most efficient results. Also, under present practice, the welding causes a thinning of the overlapping margins, and this necessitates the use of a welding rod by means of which additional metal is deposited to make up for this thinning.

The objects of my invention are to overcome the difficulties above pointed out, and to produce a spiral pipe of greater uniformity and greater mechanical strength than present spiral pipe, and to do so with greater speed and efficiency than obtains under the present practice.

My invention is illustrated in the accompanying drawing, in which

Figure 1 is a plan view of a section of the improved metal strip which I employ;

Figure 2 is a cross-sectional view thereof, on a larger scale, taken on a plane of the line 2—2 of Figure 1;

Figure 3 illustrates the manner of winding and welding the strip to form the spiral pipe;

Figure 4 is a sectional view, taken longitudinally of the pipe, showing the overlap of the convolutions before welding;

Figure 5 is a view similar to Figure 4 showing the overlap of the convolutions after welding; and Figure 6 is a view similar to Figure 4 showing a modification.

Referring first to Figures 1 and 2, the metal strip is indicated at $a$. It is known that commercial metal strip, suitable for winding into spiral pipe, does not have its edges $b$ and $c$ exactly straight, which means that there are variations in the width of the strip, and, obviously, this affects the uniformity of the overlap, in winding, and the accuracy with which the winding may be performed.

In accordance with my invention, I preform the strip, by rolling, so as to produce in one margin of the strip, on its upper side, a longitudinally extending rounded bead $d$, and in the opposite margin of the strip, on its under side, a longitudinally extending corresponding rounded groove $e$, the edge of the first named margin being tapered in cross-section, as indicated at $e'$, and the other margin being preferably offset upwardly, correspondingly, as indicated at $f$, so that, as will be clear presently, the internal surface of the ultimate pipe will be uniform.

This preforming rolling operation is so performed that the center lines $x$ and $y$, of the bead $d$ and groove $e$, respectively, are inevitably uniformly spaced from each other, and, in the winding operation to follow, each convolution is lapped over the preceding convolution, so that the bead $d$ enters the groove $e$, as will now be made clear.

The winding operation is illustrated in Figure 3, where there is diagrammatically shown the rotating mandrel $g$, and the welding head $h$ having the carbon welding electrode $i$. The metal strip $a$ is wound upon the mandrel as shown, the convolutions overlapping as above stated, and the welding head $h$ is so positioned that the electrode $i$ directs the welding arc to the overlap, preferably in line with the apex of the bead.

The overlapping margins of the metal strip, as wound upon the mandrel, are illustrated in Figure 4, and it will be clear that, so wound, the distance, longitudinally of the pipe, from one convolution to the next, will be uniform. Thus the complementary bead and groove provide means whereby each convolution is accurately seated on the preceding one, and it is also in point that the bead and groove act as strengthening ribs.

It will also be observed that, in the formation of the bead, the thickness of the strip, in that zone, is increased, this being accomplished by upsetting in the process of rolling. When the bead is formed in this particular way, there is thus additional metal, in the strip itself, in the welding zone, a surplus which eliminates the necessity of using a welding rod for depositing additional metal to make up for deficiency occasioned by the welding. A further advantage of upsetting or thickening the marginal portion of the strip in this manner, is that it provides ample thickness of backing metal below the weld, guarding against burning through the underlap during the welding operation. This is clearly shown in the drawing, and the advantages thereof are obvious.

As above indicated, it is preferable that the welding arc be applied on the line of the apex of the bead, the resulting weld then being as indicated at $w$ in Figure 5. I wish it understood, however, that, in the broader aspects of my invention, it is not essential that the arc be applied at the apex of the bead; it may be applied to one side or the other.

It will be observed that the tapering of the margin of the strip which has the bead, and the corresponding offsetting of the margin which has the groove, make it possible to keep the interior surface of the pipe uniform and smooth, notwithstanding the overlaps.

In Figure 6, which is similar to Figure 4, I illustrate another form of complementary margins of the metal strip, within the purview of my invention.

I claim:—

1. A metal strip for spiral pipe having a portion of one margin upset to provide a longitudinally extending bead projecting beyond the outer face of the strip and forming a zone of materially greater thickness than the body of the strip, the inner face of the strip in this zone being flat, and having the other margin formed to provide a complementary longitudinally extending groove.

2. The method of producing tubing from metal strip by welding, which comprises upsetting one margin of a metal strip to form a longitudinally extending bead, thus providing a zone of greater thickness than the body of the strip, and forming the other margin to receive such bead, winding the strip spirally into tubular form with said margins nested together, and arc welding said elements together by means of a non-metallic welding electrode.

3. The method of producing tubing from metal strip by welding, which comprises forming one margin of the strip to provide a solid element of approximately triangular cross-section of greater thickness than the body of the strip and having its base flush with the bottom of the strip, and tapering said margin to a thin edge at the adjacent edge of said strip, forming the other edge portion of the strip to provide a second element uniformly spaced from and to seat upon said first element, winding said strip spirally into tubular form with said second element receiving said first element and forming therewith a lap joint comprising a bead projecting outwardly from the wound tubing, and welding said elements together along the apex of the bead.

4. As a new article of manufacture, spiral pipe formed of metal strip wound spirally into tubular form with lap joints between adjacent convolutions, the overlap portion and the underlap portion of the strip having, respectively, a lengthwise groove and a lengthwise outwardly projecting bead of rounded cross-section forming a zone of greater thickness than the body of the strip, said bead and groove fitting one within the other and cooperating to form a reinforcing element extending about the wound tubing and being welded together.

5. A metal strip for spiral pipe provided adjacent one side thereof with a marginal element projecting beyond the outer face of the strip and forming a zone of greater thickness than the body thereof, the inner face of the strip in the zone of said element being flat and smooth, said strip being provided adjacent its other side with a marginal element disposed to seat upon said first element when said strip is wound spirally into tubular form with the following marginal portion of each convolution overlying the leading marginal portion of the next preceding convolution and forming therewith a lap joint.

6. A metal strip for producing spiral pipe by winding said strip spirally into tubular form with the following marginal portion of each convolution overlying the leading marginal portion of the next preceding convolution to form therewith a lap joint and welding the overlap and the underlap of the joint together, said strip being provided at the leading marginal portion thereof with a lengthwise element projecting beyond the outer face of the strip and forming a zone of greater thickness than the body thereof for providing increased thickness of backing metal during welding of the joint along the line of said element.

7. The method of producing tubing from metal strip by welding, which comprises forming one margin of the strip to provide a thickened element of greater thickness than the body of the strip, winding said strip spirally into tubular form with the other margin thereof overlying said thickened element and forming therewith a lap joint, and welding the overlap of said joint to the underlap thereof along said thickened element.

8. The method of producing tubing from metal strip by welding, which comprises forming one margin of the strip to provide a thickened element of greater thickness than the body of the strip, and projecting beyond the outer face thereof, forming the other margin of the strip to provide a groove in the inner face thereof adapted to receive said element, winding said strip spirally into tubular form with said element fitting into said groove and the marginal portions of the convolutions forming a lap joint, and welding the overlap of said joint to the underlap thereof along said thickened element.

9. The method of producing tubing from metal strip by welding, which comprises forming one margin of the strip to provide a thickened element of greater thickness than the body of the strip, winding said strip spirally into tubular form with the other margin thereof overlying said thickened element and forming therewith a lap joint, and securing the overlap of said joint to the underlap thereof by welding through said overlap into said thickened element.

EDWARD HALL TAYLOR.